US012109669B2

(12) United States Patent
Lin et al.

(10) Patent No.: US 12,109,669 B2
(45) Date of Patent: Oct. 8, 2024

(54) PIPE PLIER STRUCTURE

(71) Applicants: Yung-Sheng Lin, Taichung (TW); Shih-Liang Huang, Taichung (TW)

(72) Inventors: Yung-Sheng Lin, Taichung (TW); Shih-Liang Huang, Taichung (TW)

( * ) Notice: Subject to any disclaimer, the term of this patent is extended or adjusted under 35 U.S.C. 154(b) by 350 days.

(21) Appl. No.: 17/716,081

(22) Filed: Apr. 8, 2022

(65) Prior Publication Data

US 2023/0321795 A1 Oct. 12, 2023

(51) Int. Cl.
*B25B 13/50* (2006.01)

(52) U.S. Cl.
CPC .................................. *B25B 13/505* (2013.01)

(58) Field of Classification Search
CPC .............................. B25B 13/505; B25B 13/28
USPC ............................................................ 81/355
See application file for complete search history.

(56) References Cited

U.S. PATENT DOCUMENTS 6,026,714 A * 2/2000 Chang ..................... B25B 13/28 81/412
6,305,251 B1 * 10/2001 Pasbrig ................... B25B 13/28 81/94
6,971,288 B2 * 12/2005 Wei ....................... B25B 13/505 81/111
7,044,030 B2 * 5/2006 Chartier ................ B25B 13/505 81/111
7,546,784 B1 6/2009 Yu
7,882,768 B2 * 2/2011 Urquizu Osa .......... B25B 13/28 81/111

* cited by examiner

*Primary Examiner* — Hadi Shakeri

(74) *Attorney, Agent, or Firm* — Chun-Ming Shih; LANWAY IPR SERVICES

(57) ABSTRACT

A pipe plier structure includes a first body, a second body, a pivot member, and a locking member. The first body is provided with multiple first teeth, an arc line, an axis, a first vertical line, a radius, a first angle, and a second angle. The second body is provided with multiple second teeth, multiple third teeth, a second vertical line, a first connecting line, a second connecting line, a third angle, a fourth angle, a concave face, a fifth angle, a sixth angle, a seventh angle, and an eighth angle. The pivot member is assembled with the first body and the second body. The locking member is assembled with the first body and the second body. The locking member provides an elastically restoring force to the first body and the second body after the second body is extended outward relative to the first body.

4 Claims, 6 Drawing Sheets

PIPE PLIER STRUCTURE

BACKGROUND OF THE INVENTION

1. Field of the Invention

The present invention relates to a hand tool and, more particularly, to a pipe plier structure or a pair of pipe pliers.

2. Description of the Related Art

A conventional pipe plier structure was disclosed in the U.S. Pat. No. 7,546,784, and comprises a shank 10, a fixed jaw 15, and a movable jaw 20. The fixed jaw 15 is locked on the shank 10. The fixed jaw 15 has multiple locking teeth 150. The movable jaw 20 is pivotally connected with the shank by a pivot shaft 12. The movable jaw 20 has a first toothed face 21 and a second toothed face 22. The first toothed face 21 has multiple first engaging teeth 210, and the second toothed face 22 has multiple second engaging teeth 220. An angle between the locking teeth 150 of the fixed jaw 15 is ranged between 90° and 92°. An angle between the first engaging teeth 210 of the first toothed face 21 is ranged between 93° and 97°. An angle between the second engaging teeth 220 of the second toothed face 22 is ranged between 93° and 97°. A line L1 passes the apexes of the first engaging teeth 210 of the first toothed face 21. A line L2 passes the apexes of the second engaging teeth 220 of the second toothed face 22. An angle H between the line L1 and the line L2 is ranged between 134° and 136°. In addition, the locking teeth 150 of the fixed jaw 15 and the workpiece 30 have a first contact point P1 and a first tangent line L3, the first engaging teeth 210 of the first toothed face 21 of the movable jaw 20 and the workpiece 30 have a second contact point P2 and a second tangent line L4, and the second engaging teeth 220 of the second toothed face 22 of the movable jaw 20 and the workpiece 30 have a third contact point P3 and a third tangent line L5. The third tangent line L5 and a face of a contacting one of the second engaging teeth 220 of the second toothed face 22 of the movable jaw 20 have an included angle C ranged between 160° and 176°.

However, the conventional pipe plier structure has the following disadvantages.

1. When the movable jaw 20 is used to rotate a pipe with the minimum size at the first position, an angle between the first engaging teeth 210 of the first toothed face 21 and an imaginary vertical line is close to 90°. That is, the first engaging teeth 210 is almost horizontal, and the second engaging teeth 220 is almost vertical. In such a manner, when the fixed jaw 15 and the movable jaw are used to rotate a circular pipe with a smaller size, the axis of the pipe is arranged at the left side of that of the locking teeth 150 and is far distant from that of the locking teeth 150. In addition, when the fixed jaw 15 and the movable jaw 20 are used to rotate a circular pipe with a larger size, the axis of the pipe is also arranged at the left side of that of the locking teeth 150. Thus, the first engaging teeth 210 is almost horizontal, the pipes of different sizes are constantly arranged at the left side of the locking teeth 150 so that the pipes of different sizes are not evenly distributed at two opposite sides of the locking teeth 150.
2. When the circular pipe with a smaller size is arranged at the left side of the locking teeth 150, and when the axis of the pipe is far distant from that of the locking teeth 150, the pipe will slip and is easily detached from the fixed jaw 15 and the movable jaw 20.
3. An angle between the first engaging teeth 210 of the first toothed face 21 of the movable jaw 20 is ranged between 93° and 97°, and an angle between the second engaging teeth 220 of the second toothed face 22 of the movable jaw 20 is ranged between 93° and 97°. A hexagonal screw member has six faces wherein any two faces have an angle of 120°. Thus, when the conventional pipe plier structure is used to rotate the hexagonal screw member, the fixed jaw 15 and the movable jaw 20 cannot be used to clamp and rotate the hexagonal screw member.

BRIEF SUMMARY OF THE INVENTION

The primary objective of the present invention is to provide a pipe plier structure having a better rotation effect.

In accordance with the present invention, there is provided a pipe plier structure comprising a first body, a second body, a pivot member, and a locking member. The first body is provided with a plurality of first teeth, an arc line, an axis, a first vertical line, a radius, a first angle, and a second angle. The second body is provided with a plurality of second teeth, a plurality of third teeth, a second vertical line, a first connecting line, a second connecting line, a third angle, a fourth angle, a concave face, a fifth angle, a sixth angle, a seventh angle, and an eighth angle. The pivot member is assembled with the first body and the second body. The locking member is assembled with the first body and the second body. The locking member provides an elastically restoring force to the first body and the second body after the second body is extended outward relative to the first body.

According to the primary advantage of the present invention, when the second body is under a minimum rotation state, the third teeth are closest to the first teeth. A fourth angle is defined between the second connecting line and the second vertical line. The first circle is arranged at one side of the first vertical line when the pipe plier structure is rotated. When the pipe plier structure is under a larger rotation state, the second circle is arranged at the other side of the first vertical line. Thus, when the first body and the second body are used to rotate pipes of different specifications, the pipes of different specifications are from one side of the first vertical line to the other side of the first vertical line, so that the pipes of different specifications are distributed to the two sides of the first vertical line and will not be concentrated at a single side of the first vertical line.

According to another advantage of the present invention, the third angle is 120°. The second body is rotated relative to the first body, with the pivot member and the second pivot portion functioning as an axis, so that the first body and the second body of the pipe plier structure are used to clamp the first operation member, the second operation member, various screw members, and various pipes of different specifications and different diameter, thereby enhancing the versatility of the pipe plier structure.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
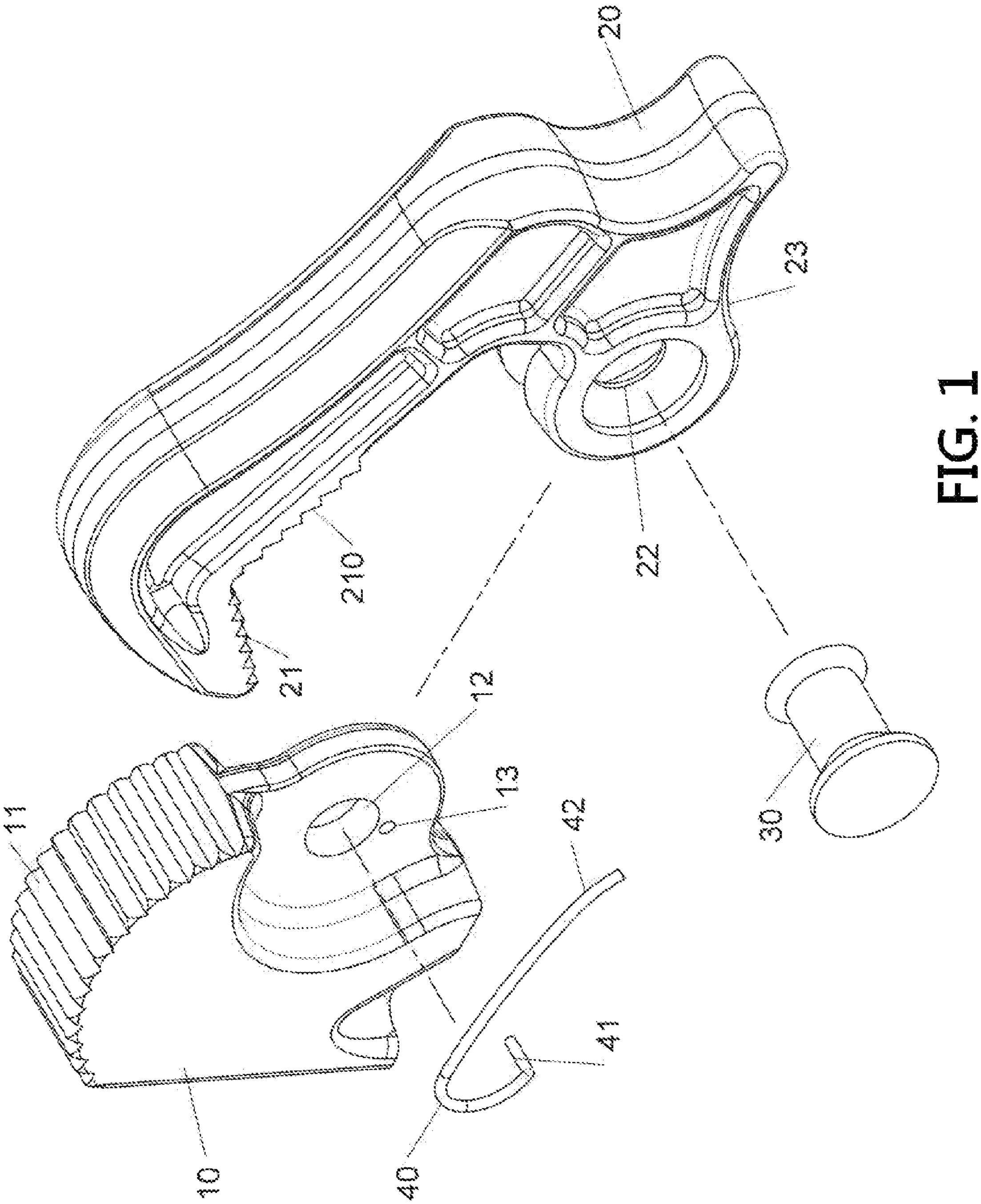
FIG. 1 is an exploded perspective view of a pipe plier structure in accordance with the preferred embodiment of the present invention.
Figure 2:
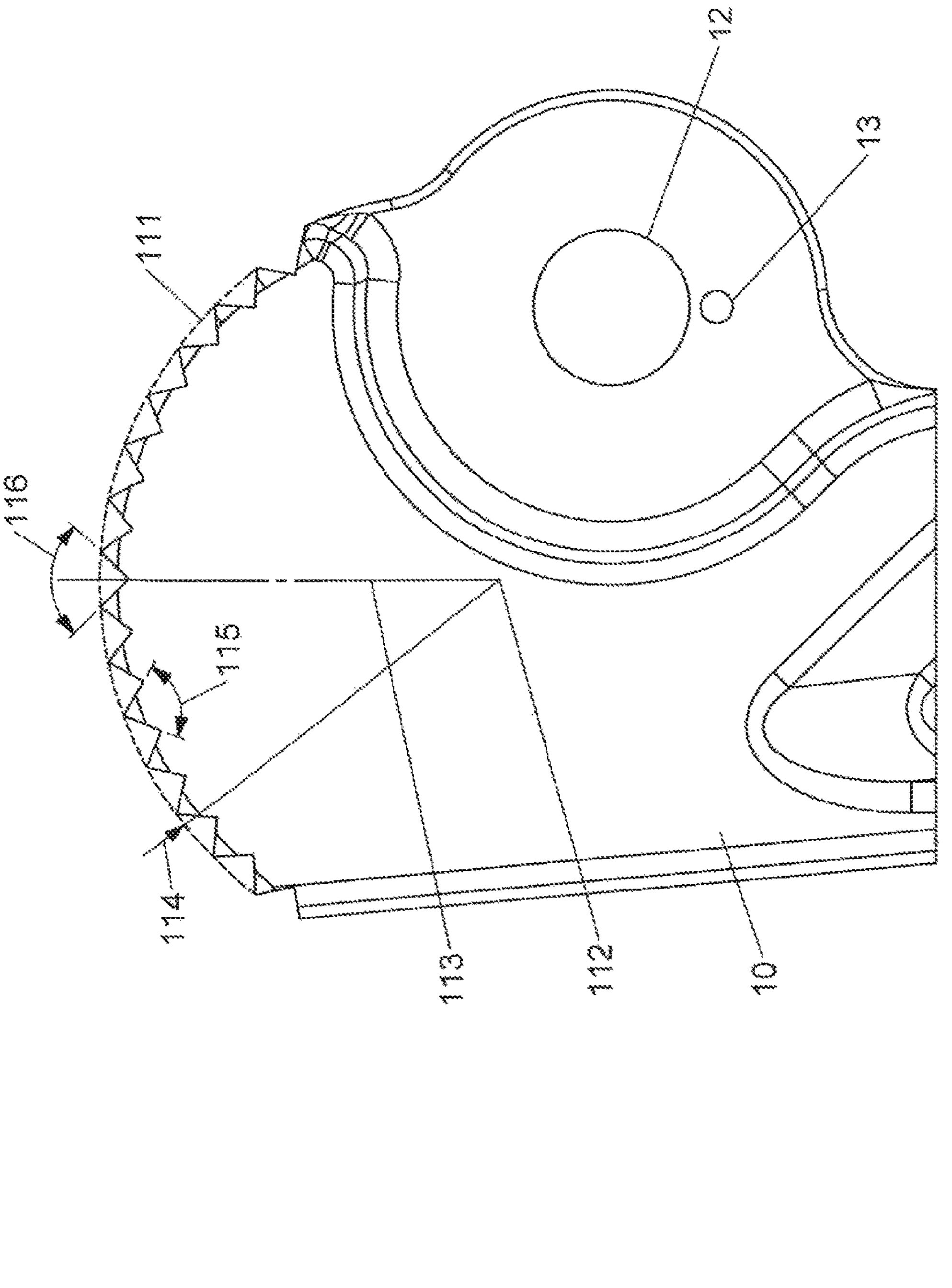
FIG. 2 is a front view of a first body of the pipe plier structure in accordance with the preferred embodiment of the present invention.
Figure 3:
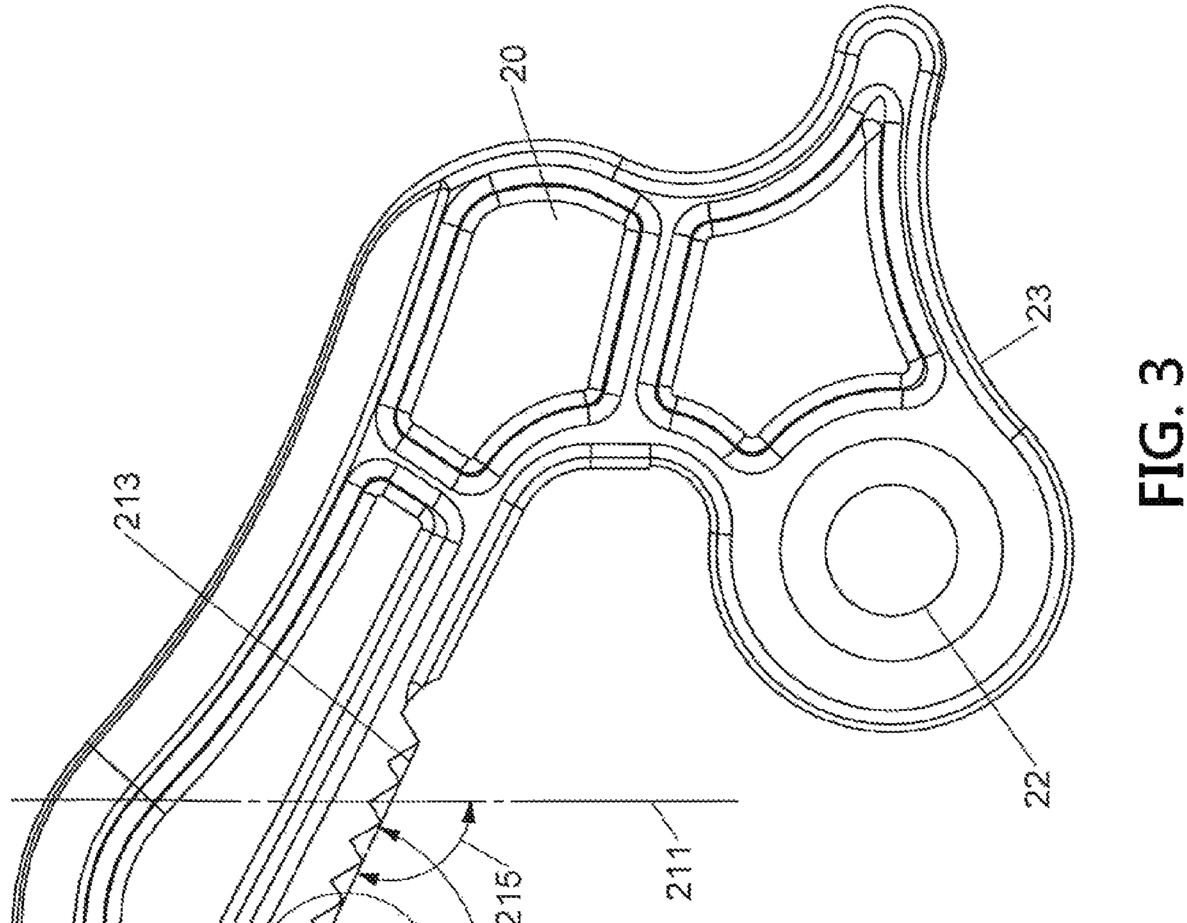
FIG. 3 is a front view of a second body of the pipe plier structure in accordance with the preferred embodiment of the present invention.
Figure 4:
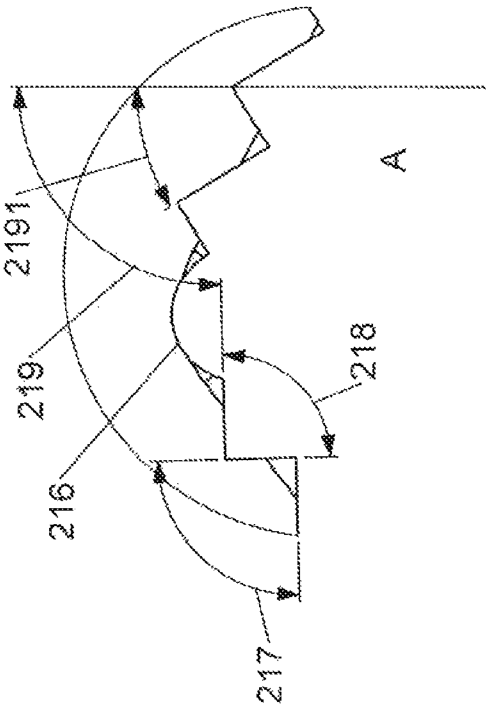
FIG. 4 is a locally enlarged view of the pipe plier structure taken along a circular mark A as shown in FIG. 3.

Referring to the drawings and initially to FIGS. 1-4, a pipe plier structure in accordance with the preferred embodiment of the present invention comprises a first body 10, a second body 20, a pivot member 30, and a locking member 40.

The first body 10 is a serrated jaw. The first body 10 is provided with a plurality of first teeth 11. The first teeth 11 have an arcuate convex annular arrangement. Each of the first teeth 11 has a tooth crest (or top or apex). An arc line 111 passes through and connects the tooth crests of the first teeth 11. The arc line 111 is a single arc. The arc line 111 has an axis 112. A first vertical line 113 passes through the axis 112. The first vertical line 113 bisects the first teeth 11 and functions as a perpendicular bisector of the first teeth 11. The arc line 111 has a radius 114. Each of the first teeth 11 has an inside defining a first angle 115. The first angle 115 is ranged between 75° and 89° or the first angle 115 is 82°. A second angle 116 is defined between any two of the first teeth 11. The second angle 116 is ranged between 83° and 97° or the second angle 116 is 90°. The second angle 116 is more than the first angle 115. The first body 10 is provided with a first pivot portion 12. The first pivot portion 12 is a circular perforation. The first body 10 is provided with a first locking portion 13. The first locking portion 13 is a cavity or a hole. The first locking portion 13 is close to the first pivot portion 12.

The second body 20 is pivotally connected with the first body 10. The second body 20 is a serrated jaw corresponding to the first body 10. The second body 20 is provided with a plurality of second teeth 21 and a plurality of third teeth 210. The second teeth 21 are directed toward the first teeth 11. The second teeth 21 have a straight line arrangement. The third teeth 210 are directed toward the first teeth 11. The third teeth 210 have a straight line arrangement. The second body 20 has a second vertical line 211 which is an imaginary (or phantom) line. The second vertical line 211 is parallel with or coincide the first vertical line 113. Each of the second teeth 21 has a tooth crest (or top or apex). A first connecting line 212 passes through and connects the tooth crests of the second teeth 21. Each of the third teeth 210 has a tooth crest (or top or apex). A second connecting line 213 passes through and connects the tooth crests of the third teeth 210. A third angle 214 is defined between the first connecting line 212 and the second connecting line 213. The third angle 214 is 120°. The third teeth 210 are closest to the first teeth 11 under a minimum rotation of the second body 20. A fourth angle 215 is defined between the second connecting line 213 and the second vertical line 211. The fourth angle 215 is ranged between 110° and 120° or the fourth angle 215 is ranged between 110° and 116° or the fourth angle 215 is 115°. The second body 20 is provided with a concave face 216 formed between the second teeth 21 and the third teeth 210. The concave face 216 is a single arcuate face. Each of the second teeth 21 has an inside defining a fifth angle 217. The fifth angle 217 is close to or equal to 90° or the fifth angle 217 is ranged between 88° and 92°. A sixth angle 218 is defined between any two of the second teeth 21. The sixth angle 218 is close to or equal to 90° or the sixth angle 218 is ranged between 88° and 92°. A seventh angle 219 is defined between a longer side of each of the second teeth 21 and the second vertical line 211. The seventh angle 219 is ranged between 85° and 96° or the seventh angle 219 is 91.5°. An eighth angle 2191 is defined between a longer side of each of the third teeth 210 and the second vertical line 211. The eighth angle 2191 is ranged between 26° and 36° or the eighth angle 2191 is 31.5°.

The second body 20 is provided with a second pivot portion 22 aligning with the first pivot portion 12. The second pivot portion 22 is a circular perforation. The second body 20 is provided with a second locking portion 23. The second locking portion 23 is distant from the second teeth 21 and the third teeth 210.

In the preferred embodiment of the present invention, the first body and the first teeth 11 are formed integrally. Alternatively, the first teeth 11 construct a single element that is then assembled on the first body 10.

In the preferred embodiment of the present invention, the second body 20 and the second teeth 21 are formed integrally. Alternatively, the second teeth 21 construct a single element that is then assembled on the second body 20.

In the preferred embodiment of the present invention, the second body 20 and the third teeth 210 are formed integrally. Alternatively, the third teeth 210 construct a single element that is then assembled on the second body 20.

The pivot member 30 is assembled with the first body 10 and the second body 20. The pivot member 30 extends pivotally through the first pivot portion 12 and the second pivot portion 22. Thus, the second body 20 is pivoted relative to the first body 10 about the pivot member 30 and the second pivot portion 22. In addition, the first body 10 and the second body 20 are pivotally connected by the pivot member 30 without detachment.

The locking member 40 is assembled with the first body 10 and the second body 20. The locking member 40 is hidden in the second body 20. The locking member 40 has a first end provided with a third locking portion 41 locked on the first locking portion 13. The locking member 40 has a second end provided with a fourth locking portion 42 mounted on the second locking portion 23. The fourth locking portion 42 is distant from the third locking portion 41. The locking member 40 contains elasticity. The locking member 40 provides an elastically restoring force to the first body 10 and the second body after the second body 20 is extended outward relative to the first body 10.

Figure 5:
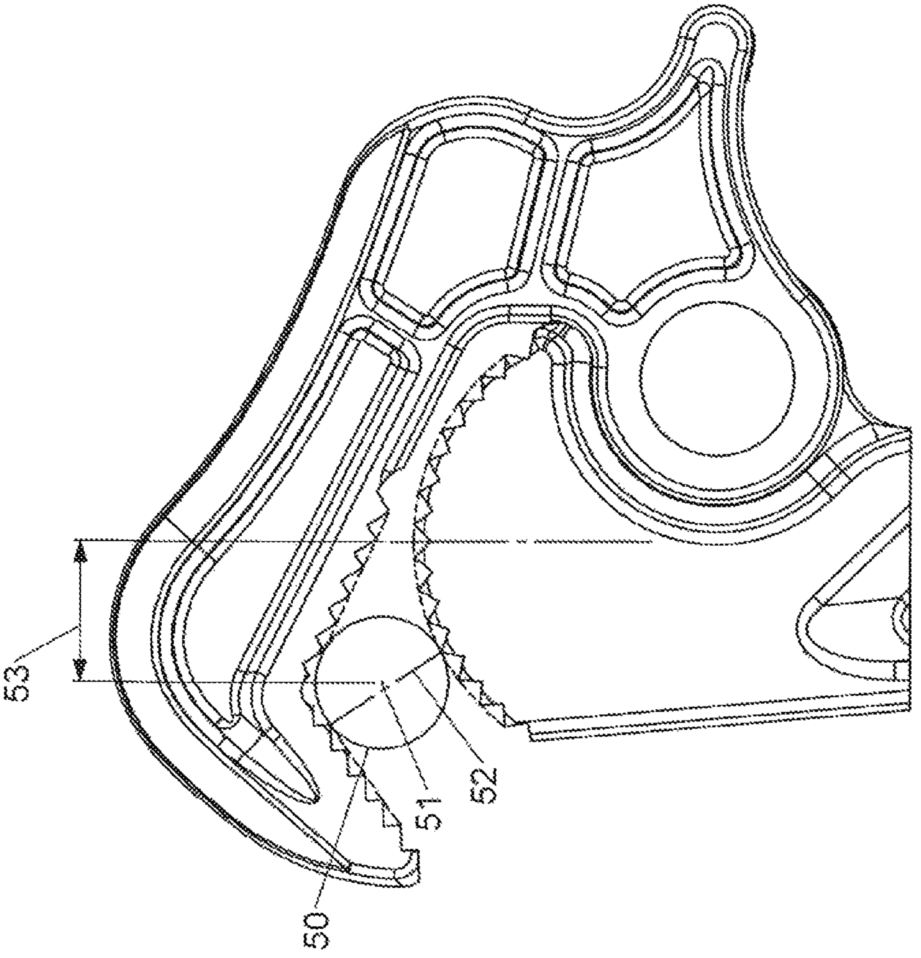
FIG. 5 is a schematic view showing a first operation mode of the pipe plier structure in accordance with the preferred embodiment of the present invention.

Referring to FIG. 5 with reference to FIGS. 1-4, a minimum clamping state is defined between the first body 10 and the second body 20, and a first circle 50 is defined between the first body 10 and the second body 20 when the third teeth 210 are closest to the first teeth 11. The first circle 50 is arranged at one side of the first vertical line 113. The first circle 50 has a first center 51. A third connecting line 52 passes through a contact point of the first teeth 11 and the first circle 50 and a contact point of the second teeth 21 and the first circle 50. The third connecting line 52 connects the arc line 111 to the first connecting line 212. The first center 51 is arranged between the third connecting line 52 and the first vertical line 113. A first distance 53 is defined between the first center 51 and the first vertical line 113.

Figure 6:
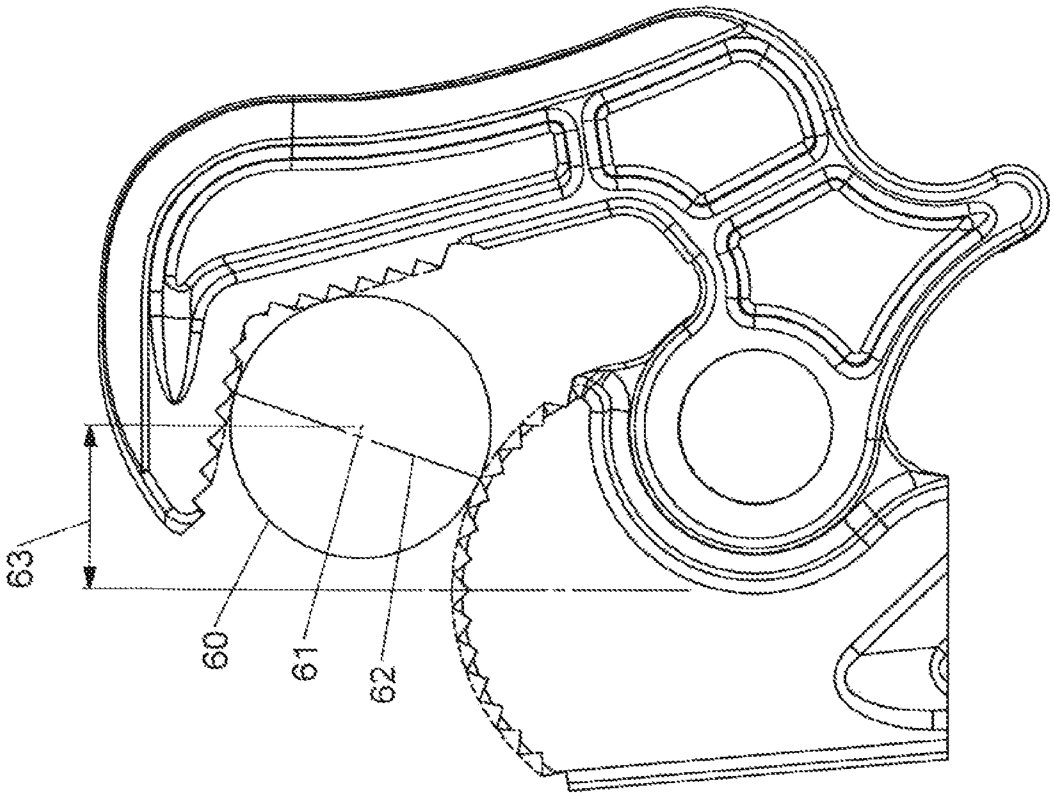
FIG. 6 is a schematic view showing a second operation mode of the pipe plier structure in accordance with the preferred embodiment of the present invention.

Referring to FIG. 6 with reference to FIGS. 1-5, when a larger clamping state is defined between the first body 10 and the second body 20, a second circle 60 is defined between the first body 10 and the second body 20. The second circle 60 is arranged at the other side of the first vertical line 113 so that the first vertical line 113 is arranged between the first circle 50 and the second circle 60. The second circle 60 has a second center 61. A fourth connecting line 62 passes through a contact point of the first teeth 11 and the second circle 60 and a contact point of the second teeth 21 and the second circle 60. The second center 61 is arranged at a right side (or an inner side) of the fourth connecting line 62. A second distance 63 is defined between the second center 61 and the first vertical line 113.

The second distance 63 is more than the first distance 53 when a ratio of an outer diameter of the second circle 60 and that of the first circle 50 is close to two, and when the ratio is more than two and less than 2.5. A ratio of the second distance 63 and the first distance 53 is ranged between 2 and 1.1 or ranged between 1.6 and 1.1.

Figure 8:
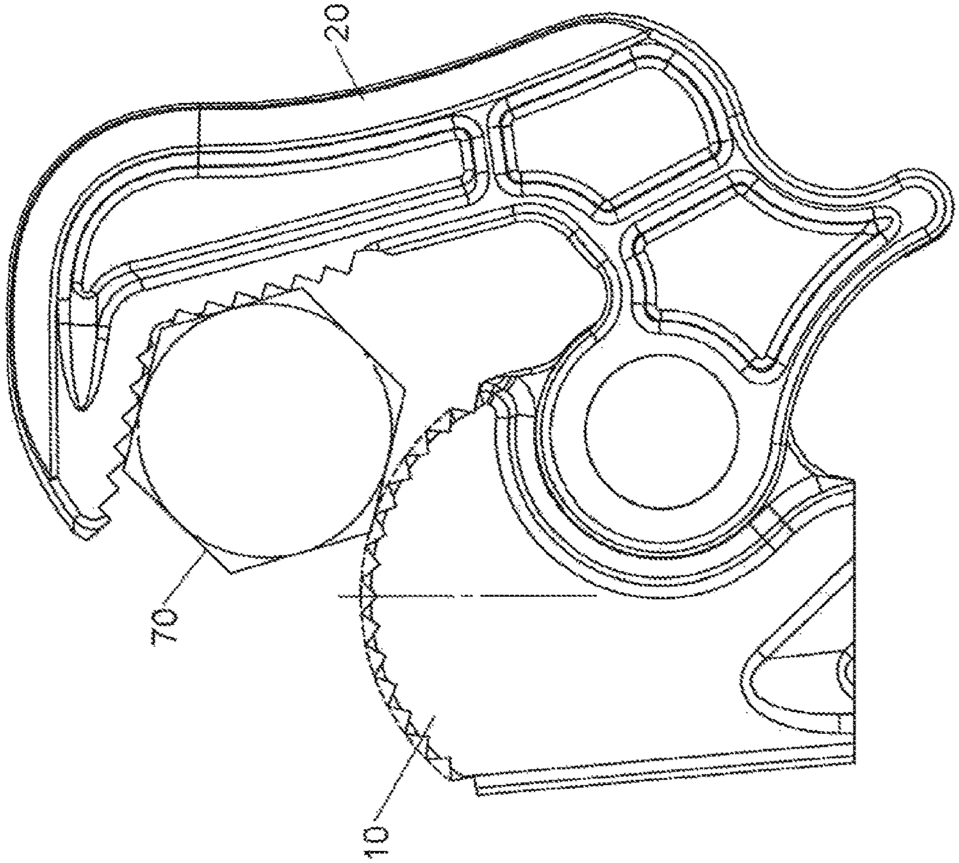
FIG. 8 is a schematic view showing a fourth operation mode of the pipe plier structure in accordance with the preferred embodiment of the present invention.
Figure 7:
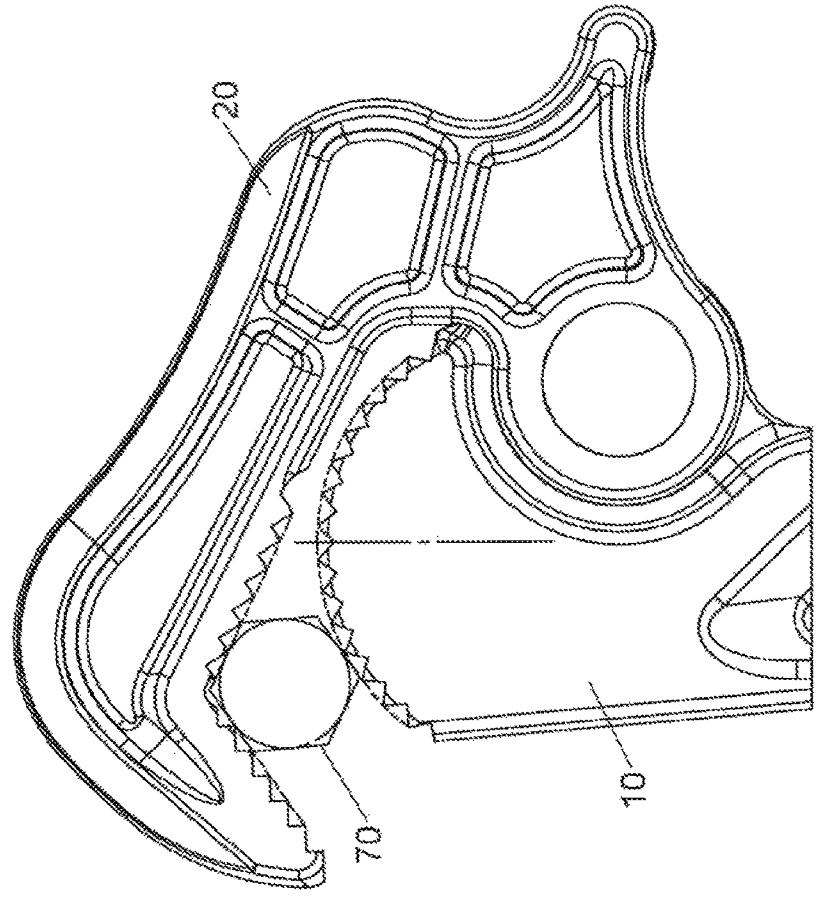
FIG. 7 is a schematic view showing a third operation mode of the pipe plier structure in accordance with the preferred embodiment of the present invention.

Referring to FIGS. 7 and 8 with reference to FIGS. 1-4, the second body 20 is assembled with the first body 10. The pivot member 30 extends pivotally through the first pivot portion 12 and the second pivot portion 22. A first operation member 70 is mounted between the first body 10 and the second body 20. The first operation member 70 is preferably a hexagonal screw member. A degree defined between any two sides of the first operation member 70 is of 120°, and the third angle 214 is 120°, so that the first operation member 70 is clamped between the first body 10 and the second body 20 firmly. Thus, the first body 10 and the second body 20 are used to clamp and rotate the first operation member 70 of different specifications as shown in FIGS. 7 and 8.

Figure 9:
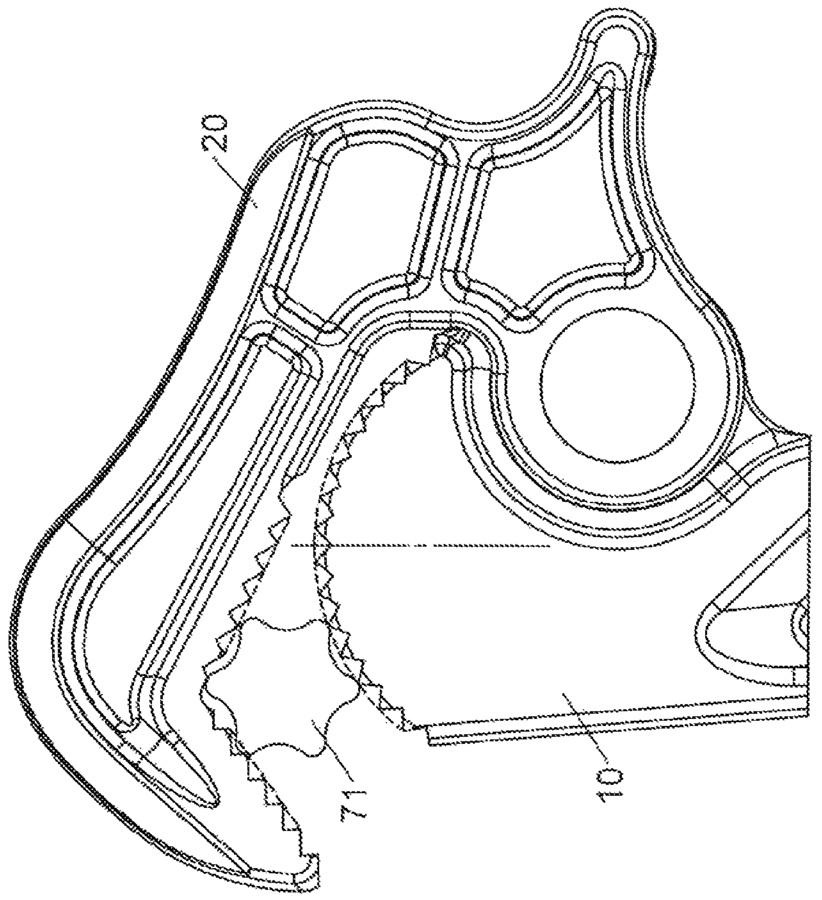
FIG. 9 is a schematic view showing a fifth operation mode of the pipe plier structure in accordance with the preferred embodiment of the present invention.

Referring to FIG. 9 with reference to FIGS. 1-4, a second operation member 71 is mounted between the first body 10 and the second body 20. The first operation member 70 is preferably a star-shaped screw member. Thus, the first body 10 and the second body 20 are used to clamp and rotate the second operation member 71 of different specifications.

Accordingly, the pipe plier structure in accordance with the preferred embodiment of the present invention has the following advantages.

1. As shown in FIG. 5, when the second body 20 is under a minimum rotation state, the third teeth 210 are closest to the first teeth 11. A fourth angle 215 is defined between the second connecting line 213 and the second vertical line 211. The first circle 50 is arranged at one side of the first vertical line 113 when the pipe plier structure is rotated. As shown in FIG. 6, when the pipe plier structure (or the second body 20) is under a larger rotation state, the second circle 60 is arranged at the other side of the first vertical line 113. Thus, when the first body 10 and the second body 20 are used to rotate pipes of different specifications, the pipes of different specifications are from one side of the first vertical line 113 to the other side of the first vertical line 113, so that the pipes of different specifications are distributed to the two sides of the first vertical line 113 and will not be concentrated at a single side of the first vertical line 113.
2. The first center 51 is arranged at an inner side of the third connecting line 52, so that when the first body 10 and the second body 20 are used to clamp and rotate the first circle 50, the first circle 50 is closed to the first vertical line 113. Thus, when the pipe plier structure is used to rotate a pipe with a smaller specification, the first circle 50 will not slip and is not detached from the pipe plier structure easily.
3. The second center 61 is arranged at the inner side of the fourth connecting line 62. Thus, when the first body 10 and the second body 20 of the pipe plier structure are used to rotate the second circle 60, the second circle 60 will not slip and is not detached from the pipe plier structure easily.
4. When the first body 10 and the second body 20 of the pipe plier structure are used to rotate pipes of different sizes, the center of the pipe is usually situated at an inner side (or a right side) of the connecting line as shown in FIGS. 5 and 6, so that the pipe is not easily detached from the pipe plier structure.
5. The third angle 214 is 120°. The second body 20 is rotated relative to the first body 10, with the pivot member 30 and the second pivot portion 22 functioning as an axis, so that the first body 10 and the second body 20 of the pipe plier structure are used to clamp the first operation member 70, the second operation member 71, various screw members, and various pipes of different specifications and different diameter, thereby enhancing the versatility of the pipe plier structure.
6. The third angle 214 defined between the first connecting line 212 and the second connecting line 213 is 120°, so that the first body 10 and the second body 20 are used to firmly clamp a hexagonal or star-shaped screw member.
7. The locking member 40 contains elasticity and provides an elastically restoring force to the first body 10 and the second body 20 so that the second body 20 and the first body 10 are closed quickly after the second body 20 is extended outward relative to the first body 10 to facilitate the user operating the pipe plier structure.
8. The user only needs to drive and move the second body 20 relative to the first body 10 so as to open or close the second body 20 and the first body 10, so that the pipe plier structure is operated by the user's one hand, thereby facilitating the user operating the pipe plier structure.
9. The first body 10 and the second body 20 are assembled by the pivot member 30 and the locking member 40 so that the pipe plier structure has a lower cost of fabrication and assembly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A pipe plier structure comprising:

a first body, a second body, a pivot member, and a locking member;

wherein:

the first body is a serrated jaw;

the first body is provided with a plurality of first teeth;

the first teeth have a convex arrangement;
each of the first teeth has a tooth crest;
an arc line passes through and connects the tooth crests of the first teeth;
the arc line is a single arc;
the arc line has an axis;
a first vertical line passes through the axis;
the first vertical line is a perpendicular bisector of the first teeth;
the arc line has a radius;
each of the first teeth has an inside defining a first angle;
the first angle is ranged between 75° and 89°;
a second angle is defined between any two of the first teeth;
the second angle is ranged between 83° and 97°;
the second angle is more than the first angle;
the first body is provided with a first pivot portion;
the first pivot portion is a circular perforation;
the first body is provided with a first locking portion;
the second body is pivotally connected with the first body;
the second body is a serrated jaw corresponding to the first body;
the second body is provided with a plurality of second teeth and a plurality of third teeth;
the second teeth are directed toward the first teeth;
the second teeth have a straight line arrangement;
the third teeth are directed toward the first teeth;
the third teeth have a straight line arrangement;
the second body has a second vertical line which is an imaginary line;
the second vertical line is parallel with or coincide the first vertical line;
each of the second teeth has a tooth crest;
a first connecting line passes through and connects the tooth crests of the second teeth;
each of the third teeth has a tooth crest;
a second connecting line passes through and connects the tooth crests of the third teeth;
a third angle is defined between the first connecting line and the second connecting line;
the third angle is 120°;
the third teeth are closest to the first teeth under a minimum rotation of the second body;
a fourth angle is defined between the second connecting line and the second vertical line;
the fourth angle is ranged between 110° and 120°;
the second body is provided with a concave face formed between the second teeth and the third teeth;
the concave face is a single arcuate face;
each of the second teeth has an inside defining a fifth angle;
the fifth angle is ranged between 88° and 92°;
a sixth angle is defined between any two of the second teeth;
the sixth angle is ranged between 88° and 92°;
a seventh angle is defined between a longer side of each of the second teeth and the second vertical line;
the seventh angle is ranged between 85° and 96°;
an eighth angle is defined between a longer side of each of the third teeth and the second vertical line;
the eighth angle is ranged between 26° and 36°;
the second body is provided with a second pivot portion aligning with the first pivot portion;
the second pivot portion is a circular perforation;
the second body is provided with a second locking portion;
the second locking portion is distant from the second teeth and the third teeth;
the pivot member is assembled with the first body and the second body;
the pivot member extends pivotally through the first pivot portion and the second pivot portion;
the second body is pivoted relative to the first body about the pivot member and the second pivot portion;
the first body and the second body are pivotally connected by the pivot member;
the locking member is assembled with the first body and the second body;
the locking member is hidden in the second body;
the locking member has a first end provided with a third locking portion locked on the first locking portion;
the locking member has a second end provided with a fourth locking portion mounted on the second locking portion;
the fourth locking portion is distant from the third locking portion;
the locking member contains elasticity;
the locking member provides an elastically restoring force to the first body and the second body after the second body is extended outward relative to the first body;
a minimum clamping state is defined between the first body and the second body, and a first circle is defined between the first body and the second body when the third teeth are closest to the first teeth;
the first circle is arranged at one side of the first vertical line;
the first circle has a first center;
a third connecting line passes through a contact point of the first teeth and the first circle and a contact point of the second teeth and the first circle;
the third connecting line connects the arc line to the first connecting line;
the first center is arranged between the third connecting line and the first vertical line;
a first distance is defined between the first center and the first vertical line;
when a larger clamping state is defined between the first body and the second body, a second circle is defined between the first body and the second body;
the second circle is arranged at the other side of the first vertical line so that the first vertical line is arranged between the first circle and the second circle;
the second circle has a second center;
a fourth connecting line passes through a contact point of the first teeth and the second circle and a contact point of the second teeth and the second circle;
the second center is arranged at an inner side of the fourth connecting line;
a second distance is defined between the second center and the first vertical line; and
a ratio of the second distance and the first distance is ranged between 2 and 1.1.

2. The pipe plier structure as claimed in claim 1, wherein:
the first locking portion is a cavity or a hole; and
the first locking portion is close to the first pivot portion.

3. The pipe plier structure as claimed in claim 1, wherein the first body and the first teeth are formed integrally or the first teeth construct a single element that is then assembled on the first body.

4. The pipe plier structure as claimed in claim 1, wherein:
the second body and the second teeth are formed integrally or the second teeth construct a single element that is then assembled on the second body; and the second body and the third teeth are formed integrally or the third teeth construct a single element that is then assembled on the second body.

* * * * *